Figure 1:
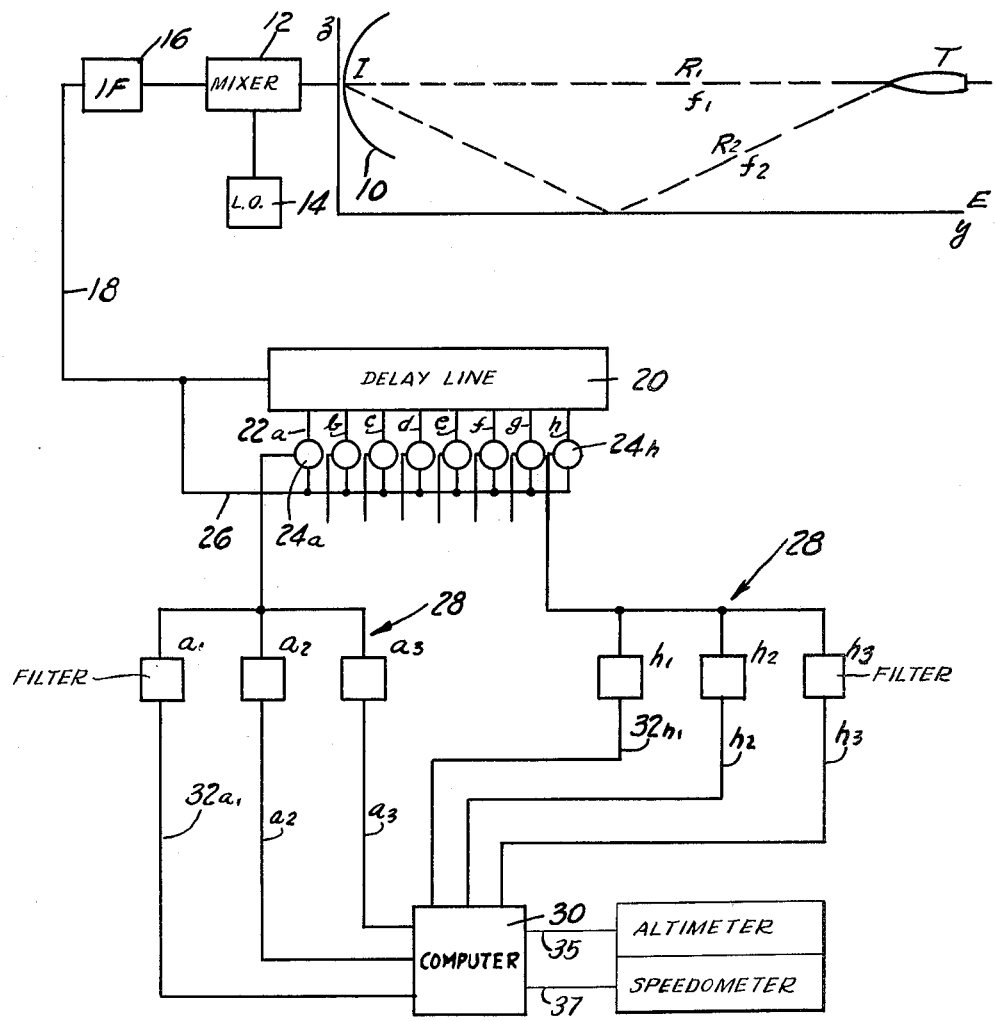

United States Patent Office 3,242,490
Patented Mar. 22, 1966

3,242,490
APPARATUS FOR AND A METHOD OF DETERMINING THE POSITION OF ELECTROMAGNETIC NOISE SOURCE
Basil W. Wentworth and Edwin L. Ellis, Ann Arbor, Mich., assignors to The Bendix Corporation, Ann Arbor, Mich., a corporation of Delaware
Filed Nov. 12, 1963, Ser. No. 324,164
2 Claims. (Cl. 343—8)

This application is a continuation-in-part of our prior application Serial No. 186,928, filed April 12, 1962, now abandoned.

This invention relates generally to means for determining the position of a source of electromagnetic noise modulation and more particularly to means for locating and tracking a jammer or source of random noise modulation when said source is moving relative to the receiver or vice versa.

In the past, it has been proposed to use at least two spaced directional receivers and triangulation techniques to locate a transmitter of electromagnetic radiation. It has also been proposed to locate a transmitter, at least approximately, by obtaining an approximate range through the utilization of the time difference between directly received and reflectively received signals from a transmitter and by obtaining an approximate bearing and elevation from a directional receiving antenna. The latter proposal, however, is limited to situations where there is little or no relative motion between the transmitter and the receiver.

There is an obvious need for a means to quickly locate the position of a jammer or source of random noise modulation which has motion relative to the receiver. Neither of the prior proposals meet this need.

It is an object of the present invention to determine the position of a jammer or source of random noise modulation having relative movement with respect to the receiver.

It is another object of this invention to provide means for locating and tracking single or multiple sources of random noise modulation from a single receiver system having a resolution and accuracy that is relatively independent of the receiving antenna beam width.

These and other objects and advantages of the invention will become readily apparent by reference to the following specification taken in connection with the appended drawings, in which:

FIGURE 1 is a schematic drawing in block form showing an embodiment of the present invention.

As shown in FIGURE 1, T designates a transmitting jammer or source of random noise modulation, I designates a receiver. As shown, both T and I are mounted in moving vehicles positioned above the earth plane E. The signal transmitted from T reaches receiver I via a direct signal path having a length $r_1$ and via a reflective signal path having a length $r_2$. With relative movement between transmitter T and receiver I, the change in range is responsible for a Doppler shift of the transmitted energy. With unequal range rates of $r_1$ and $r_2$, the Doppler shifts are also unequal in the direct and reflective paths. The receiver I is provided with an antenna 10 which may be directional or non-directional to receive the direct signal at a carrier frequency $f_1$ and the reflective signal at a carrier frequency of $f_2$. The two signals, $f_1$, $f_2$, are fed to a mixer 12 having a local oscillator 14 and then to an amplifier 16. The two signals are correlated to determine the Doppler difference frequency $f_D$ between $f_1$ and $f_2$.

The process of correlation is described in Statistical Theory of Communication, by Y. W. Lee, John Wiley and Sons Inc. (1960). In general, correlation involves three operations, time displacement of one of the signals, multiplication of the two signals and integration of the product. As shown in FIGURE 1, the two signals are transmitted by a conductor 18 to a delay line 20 which performs the first operation of the correlation process. The delay line 20 is provided with a plurality of spaced taps $22_{a-h}$ located at successively increasing time delays. Each tap $22_{a-h}$ is respectively connected to a correlator respectively designated $24_{a-h}$. The correlators $24_{a-h}$ perform the multiplication operation in the correlation process. In actual practice the correlators $24_{a-h}$ may be selected from a variety of known devices for providing multiplication such as mixers, balanced modulators, etc. A balanced modulator design suitable for the present embodiment is shown on page 303 of Active Networks by V. C. Rideout, Prentice-Hall, Inc., 1954. The correlators $24_{a-h}$ are respectively connected by line 26 to conductor 18 to provide auto-correlation of the two signals, i.e. the delayed signals from delay line 20 will be multiplied by the same signals, but undelayed from conductor 18. At one of the taps $22_{a-h}$ the signal will have been delayed sufficiently to cause the signal $f_1$ to be in time coincidence with the undelayed signal $f_2$. The power output from the correlator $24_{a-h}$ which is connected to the tap $22_{a-h}$ having the signal $f_1$ delayed sufficiently to be in time coincidence with $f_2$ will be concentrated in a relatively narrow frequency band width occurring at the Doppler difference frequency and will have relatively high peak value. The power outputs from the remaining correlators will be uniformly spread over a relatively wide frequency range, except for a concentration at or near the D.C. value. Each of the correlators $24_{a-h}$ is respectively connected to a network of band pass filters or frequency discriminators $28_{a1,a2,a3}$ . . . $h1,h2,h3$ etc. which are adapted to perform the integration operation in the correlation process. In one embodiment filters 28 are selected to constitute a band stop for D.C. or near D.C. signals and to have band widths sufficiently wide to accommodate the Doppler difference frequency $f_D$ and may be as narrow as the desired resolution requirements for the output signals from the correlator 24 wherein the signals are in timed coincidence.

The output signal from the band pass filters 28 will be predominantly a single frequency beat signal or Doppler difference frequency $f_D$. Each correlator 24 is connected to a tap having a predetermined time delay which provides a value of $\tau$ for the equations hereinafter set forth and each correlator 24 is connected to band pass filters 28 having predetermined frequency ranges which provide a value of $f_D$ to be used in the subsequent equations. For each pair of received signals having frequencies $f_1$ and $f_2$, there is a unique combination of correlator 24 and band pass filter 28 through which the output $f_D$ will pass. The outputs from band pass filters 28 are fed to a suitably programmed computer 30 such as a Litton Model C 7000 or North American VERDAN computer which detects the output lead $32_{a1,a2,a3}$ . . . $h1,h2,h3$ containing the output signal thereby identifying the time delay (necessary to provide coincidence of the two signals $f_1$, $f_2$) and also the Doppler difference frequency $f_D$.

In the example shown, where the receiver I is mounted in a moving vehicle above the earth's surface, the computer 30 is supplied with the receiver vehicle's altitude $h$ and speed $V_I$ by suitable means such as altimeter 31 and speedometer 33 through leads 35 and 37 respectively.

The computer is programmed to solve the following equations where:

$X$ = horizontal distance between source T and receiver I.
$Z$ = source altitude.
$h$ = receiver altitude.
$r_1$ = direct signal path length or line of sight range between I and T.
$r_2$ = reflected signal path length.
$C$ = speed of signal propagation.
$r_2 - r_1$ = difference in reflected and direct signal path lengths.
$\tau$ = difference in time of arrival of direct and reflected signals at I.
$f_D$ = Doppler difference frequency of the direct and reflected signals.
$f_T$ = transmitted signal or carrier frequency.
$V_T$ = horizontal speed of the source in the vertical plane containing both I and T.
$V_I$ = horizontal speed of the receiver in the vertical plane containing both I and T.
$V = V_T + V_I$ total relative horizontal speed.
$\lambda$ = transmitted signal wave length.
$\tau(t)$ = value of $\tau$ at some time $(t)$.
$f_D(t)$ = value of $f_D$ at some time $(t)$.
$\dot{\tau}$ = time rate of change of $\tau$.
$\dot{f}_D$ = time rate of change of $f_D$.

$$\tau = \frac{1}{C}(r_2 - r_1) = \frac{1}{C}\{[X^2 + (Z+h)^2]^{1/2} - [X^2 + (Z-h)^2]^{1/2}\} \quad (1)$$

$$f_D = f_T \dot{\tau} = \frac{V}{\lambda} X \{[X^2 + (Z+h)^2]^{-1/2} - [X^2 + (Z+h)^2]^{-1/2}\} \quad (2)$$

where $$r_1^2 = X^2 + (Z-h)^2 \quad (3)$$

and $$r_2^2 = X^2 + (Z+h)^2 \quad (4)$$

$$\dot{f}_D = \frac{V^2}{\lambda}\{(Z+h)^2[X^2+(Z+h)^2]^{-3/2} - (Z-h)^2[X^2+(Z-h)^2]^{-3/2}\} \quad (5)$$

where $$\frac{f_D(t_2) - f_D(t_1)}{t_2 - t_1} = \frac{\Delta f_D}{\Delta t} \approx \dot{f}_D \quad (6)$$

In the above equations the vertical velocities of I and T are ignored as in the situations of interest the values are not of sufficient magnitude to affect the result.

In one example, a source $T_1$ moving relatively to receiver I is located by determining that at one instant in time $t_1$ the output is passing through a correlator $24_c$ which is connected to a tap having a predetermined known 6.5 microsecond time delay and through a band pass filter $32_{c1}$ having a predetermined frequency range indicating that $f_D$ at time $t_1$ equals 350 cycles per second. A successive measurement at a later time $t_2$ when the output is detected from a successive output lead $22_e$ determines that the output was received from a correlator $24_e$ having a 7.5 microsecond time delay and through a band pass filter $32_{e2}$ having a predetermined frequency range indicating that $f_D$ at time $t_2$ equals 450 cycles per second. The average value of $\dot{f}_D$ over the time interval $t_2 - t_1$ may be obtained from Equation 6.

Equations 1, 2 and 5 are independent and contain three unknowns, viz. X, Z and V. The values of C and $\lambda$ are constants and the values of $\tau$ and $f_D$ can be derived from apparatus of FIGURE 1 and the value of $h$ can be supplied by known prior art devices. Since there are three unknowns and three independent equations, computer 30 may readily obtain a solution for X, Z and V and thus for the range $r_1$ from Equation 3 above.

It will be noted in the equations set forth above, directional information in the elevation plane is not required for a solution. This permits the apparatus and method of the present invention to locate and track multiple sources of random noise modulation. Furthermore, the discovery that when subjected to the method and apparatus of the present invention that noise modulated signals from the direct and reflectively received paths produce a unique signal of Doppler frequency $f_D$ resulted in the further advantage that the range of T may be uniquely determined without ambiguity.

While only one embodiment of the invention has been shown and described, it will be readily apparent to those skilled in the art that various changes and modifications may be made without departing from the spirit of the invention.

We claim:
1. A method of determining the range of a source of electromagnetic radiation relative to a receiver when said source and receiver are moving relative to each other, comprising the steps of:
   (a) receiving the transmissions from said source via a direct path and a reflective path,
   (b) correlating the directly received signal and the reflectively received signal to obtain the time difference of arrival of said signals $\tau$ at said receiver and to obtain the Doppler frequency difference $f_D$ of said signal, computing $\dot{f}_D$ the time rate of change of $f_D$,
   (c) obtaining the altitude and speed of the receiver, and
   (d) computing the range $r_1$, of the source from the receiver from the following equations:

$$r_1 = [X^2 + (Z-h)^2]^{1/2}$$

where the values of X and Z are obtained from the solution of the following three equations which contain three unknowns, X, Z, and V:

$$\tau = \frac{1}{C}\{[X^2+(Z+h)^2]^{1/2} - [X^2+(Z-h)^2]^{1/2}\}$$

$$f_D = \frac{V}{\lambda} X\{[X^2+(Z-h)^2]^{-1/2} - [X^2+(Z+h)^2]^{-1/2}\}$$

$$\dot{f}_D = \frac{V^2}{\lambda}\{(Z+h)^2[X^2+(Z+h)^2]^{-3/2} - (Z-h)^2[X^2+(Z-h)^2]^{-3/2}\}$$

where:

$r_1$ = direct signal path length or line of sight range between I and T.
$X$ = horizontal distance between source T and receiver I.
$Z$ = source altitude.
$h$ = receiver altitude.
$\tau$ = difference in time of arrival of direct and reflected signals at I.
$C$ = speed of signal propagation.
$f_D$ = Doppler difference frequency of the direct and reflected signals.
$\dot{f}_D$ = time rate of change of $f_D$.
$\lambda$ = transmitted signal wave length.
$V = V_T + V_I$ total relative horizontal speed.
$V_T$ = horizontal speed of the source.
$V_I$ = horizontal speed of the receiver.

2. A system for determining the range of a source of electromagnetic radiation moving relative to a receiver comprising:
   (a) means to detect a directly transmitted signal and a reflectively transmitted signal from said source,
   (b) means for delaying said signals,
   (c) correlator means for multiplying the delayed signals from said second mentioned means with the undelayed signals from said first mentioned means,
   (d) band pass filter means connected to said correlator means for integrating said multiplied signals and having an output indicative of the time difference and Doppler frequency difference of said directly and reflectively transmitted signals,
(e) means for determining the altitude and speed of said receiver, and
(f) computer means coupled to said last mentioned means and said band pass filter means for computing the range from said source in accordance with a predetermined program.

References Cited by the Examiner

UNITED STATES PATENTS 3,171,126  2/1965  Wiley _____ 343—100.7

CHESTER L. JUSTUS, *Primary Examiner.*

R. D. BENNETT, *Assistant Examiner.*